United States Patent
Abdi Taghi Abad et al.

(10) Patent No.: US 10,650,369 B1
(45) Date of Patent: May 12, 2020

(54) SYSTEMS AND METHODS FOR MANAGING TRANSACTIONS BY CONSOLIDATING ASSOCIATED TRANSACTIONS

(71) Applicant: Capital One Services, LLC, McLean, VA (US)

(72) Inventors: Fardin Abdi Taghi Abad, Seattle, WA (US); Austin Walters, Savoy, IL (US); Jeremy Goodsitt, Champaign, IL (US); Anh Truong, Champaign, IL (US); Mark Watson, Urbana, IL (US); Reza Farivar, Champaign, IL (US); Vincent Pham, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/295,736

(22) Filed: Mar. 7, 2019

(51) Int. Cl.
| G06Q 20/10 | (2012.01) |
| G06Q 20/12 | (2012.01) |
| G06Q 20/22 | (2012.01) |
| G06Q 20/20 | (2012.01) |

(52) U.S. Cl.
CPC .......... *G06Q 20/29* (2013.01); *G06Q 20/204* (2013.01); *G06Q 20/206* (2013.01)

(58) Field of Classification Search
CPC ...... G06Q 20/027; G06Q 20/20; G06Q 20/10; G06Q 20/12; G06Q 20/04; G06Q 20/14
USPC .......................................... 235/380; 705/40
See application file for complete search history.

(56) References Cited

U.S. PATENT DOCUMENTS

| 5,978,780 A | 11/1999 | Watson | |
| 6,993,507 B2 | 1/2006 | Meyer et al. | |
| 7,734,545 B1 | 6/2010 | Fogliano et al. | |
| 7,742,967 B1* | 6/2010 | Keresman, III | ....... G06Q 20/04 705/37 |
| 2006/0273152 A1* | 12/2006 | Fields | .................. G06Q 20/40 235/380 |
| 2016/0189117 A1* | 6/2016 | Sandraz | ................ G06Q 20/20 705/16 |

* cited by examiner

*Primary Examiner* — Hao Fu
(74) *Attorney, Agent, or Firm* — Bookoff McAndrews, PLLC

(57) ABSTRACT

Disclosed are methods, systems, and non-transitory computer-readable medium for managing transactions by consolidating associated transactions. For instance, a method may include receiving transaction information for a transaction. The transaction information may include an identifier and a transaction amount associated with the transaction. The method may further include comparing the transaction amount to a threshold to determine whether the transaction amount is equal to or above the threshold, or whether the transaction amount is below the threshold. The method may include, in response to determining that the transaction amount is below the threshold, obtaining pending transaction information, analyzing the pending transaction information to determine whether there is at least one associated transaction associated with the transaction, and performing at least one processing action to resolve the transaction.

18 Claims, 5 Drawing Sheets

SYSTEMS AND METHODS FOR MANAGING TRANSACTIONS BY CONSOLIDATING ASSOCIATED TRANSACTIONS

TECHNICAL FIELD

Various embodiments of the present disclosure relate generally to managing transactions and, more particularly, to systems and methods for managing transactions by consolidating associated transactions.

BACKGROUND

Generally, merchants are charged transaction fees for accepting credit card or debit card transactions, and the transaction fees are usually a larger percentage for smaller payment amounts as compared to larger payment amounts. For instance, some transaction fees charged by some card association systems may be a fixed fee for a transaction under a set payment amount; otherwise, the card association system may set the transaction fee as a percentage of the payment amount. For instance, the fixed fee may be $0.25 for any transaction under ten dollars, or may be 1% of the payment amount for any transaction under 10 dollars. Alternatively, some transaction fees charged by some card association systems may be a fixed fee plus a percentage of a payment amount for the transaction. For instance, the fixed fee may be one dollar plus 1% of the payment amount. Therefore, merchants that process many small transactions may incur disproportionally high transaction fees relative to merchants that do not receive as many small transactions. Therefore, merchants that process many small transactions may wish to avoid processing many small transactions.

Moreover, the communication load, processing load, and energy costs for merchant systems, transaction processor systems, card association systems, and banking systems (e.g., issuing bank systems and merchant bank systems) may be substantial when processing transactions that have small payment amounts. For instance, to process an authorization request and approval for each transaction: (1) the merchant systems may generate a first message and/or transmit the first message to the transaction processor systems; (2) the transaction processor systems may generate and transmit an acknowledgement, process the first message, and/or transmit a second message to the card association systems; (3) the card association systems may generate and transmit an acknowledgement, process the second message, and/or transmit a third message to banking systems; and (4) the banking systems may process the third message, approve or decline the transaction, and/or transmit a fourth message back to the merchant systems, the transaction processor systems, or the card association systems. Therefore, merchant systems, transaction processor systems, banking systems, and card association systems may wish to reduce a total number of transactions so as to reduce over all communication loads, processing loads, and energy costs. Also, merchant systems may wish to reduce communication loads, processing loads, and energy costs, while also avoiding the transaction fees associated with small payment amounts.

Furthermore, user wait times during a transaction may cause problems for merchants. For instance, if the network connection of the point-of-sale (POS) device is poor or slow (e.g., such that transmissions take a long period of time), or if the process time required is long, the merchant may lose business or be negatively associated with the long period of transmission time and/or the long process time. Therefore, merchants may want to reduce user wait times during a transaction.

The present disclosure is directed to overcoming one or more of these above-referenced challenges.

SUMMARY

According to certain aspects of the disclosure, systems and methods are disclosed for managing transactions.

For instance, a computer-implemented method for managing transactions may include: receiving transaction information for a transaction, the transaction information including an identifier and a transaction amount associated with the transaction; comparing the transaction amount to a threshold to determine whether the transaction amount is equal to or above the threshold, or whether the transaction amount is below the threshold; and in response to determining that the transaction amount is below the threshold: obtaining pending transaction information; analyzing the pending transaction information to determine whether there is at least one associated transaction associated with the transaction; and performing at least one processing action to resolve the transaction.

Moreover, a system for managing transactions in a point of sale device may include: a memory storing instructions; and a processor executing the instructions to perform a process. The process may include: receiving transaction information for a transaction, the transaction information including an identifier and a transaction amount associated with the transaction; obtaining processed transaction information and pending transaction information; determining whether a user associated with the identifier has returned or is likely to return based on the processed transaction information, the pending transaction information, and the identifier; and based on a result of the determining, performing at least one processing action to resolve the transaction.

Furthermore, a computer-implemented method for managing transactions may include: obtaining processed transaction information and pending transaction information, the pending transaction information including a first plurality of transactions that have been previously received and not yet processed by a system, the processed transaction information including a second plurality of transactions that are associated with users based on user identifiers; determining whether the pending transaction information has been updated; in response to determining that the pending transaction information has been updated for at least one transaction of the first plurality of transactions of the pending transaction information, determining whether a user associated with the at least one transaction is likely to return within a threshold period of time based on an analysis of the processed transaction information; and in response to determining that the user is likely to return within the threshold period of time, updating the at least one transaction in the pending transaction information.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to managing transactions and, more particularly, to systems and methods for managing transactions by consolidating associated transactions.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure is directed to managing transactions at a POS device. Specifically, as discussed in more detail below, the POS device, or any system in communication with the POS device, may consolidate transactions and process the transactions as a single transaction. In this way, a merchant associated with the POS device may avoid transaction fees that are a higher percentage of a transaction amount. Additionally or alternatively, the POS device, or any system in communication with the POS device, may reduce the number of authorization requests. As such, the POS device and/or other merchant systems, transaction processor systems, banking systems, and card association systems may reduce overall communication loads, processing loads, and/or energy costs. Furthermore, as the POS device may perform a process that does not transmit an authorization request in certain circumstances, but still approve such transactions for processing, the POS device may reduce a customer wait time.

Figure 1:
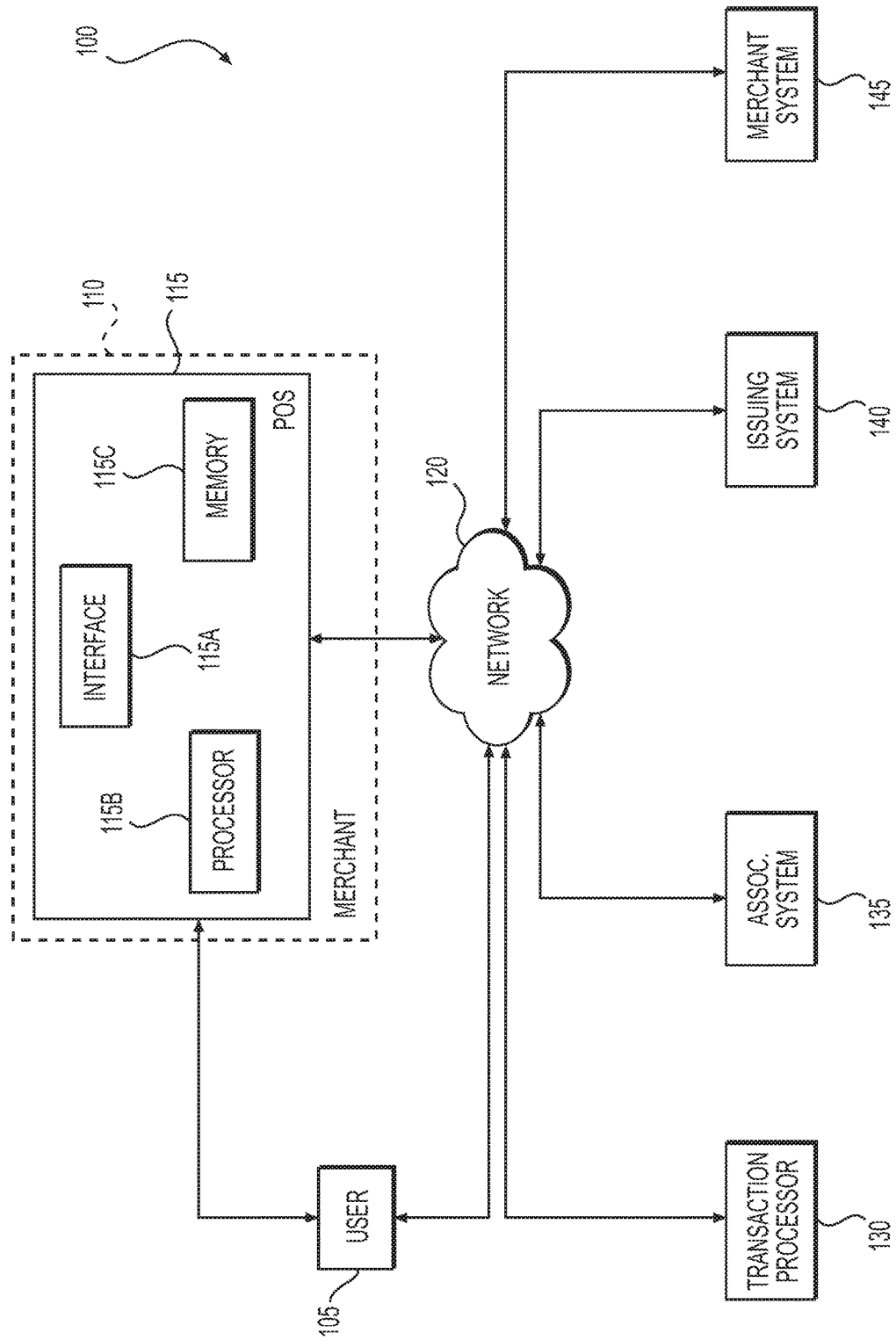
FIG. 1 depicts an exemplary system environment, according to one or more embodiments.

FIG. 1 depicts an exemplary system environment 100, according to one or more embodiments of the present disclosure. As shown, system environment 100 may include a user 105, a merchant 110, a POS device 115, a network 120, a transaction processor system 130, a card association system 135, an issuing bank system 140, and a merchant bank system 145.

The POS device 115 may include an interface 115A, a processor 115B, and a memory 115C. The memory 115C may store programs, data, and information. The programs may include instructions executable by the processor 115b to perform different functions or processes (e.g., as described in connection with FIGS. 2-4). The interface 115A may include input devices (e.g., mouse, keypad, etc.), output devices (e.g., display, speaker, touch screen, etc.), network interfaces (e.g., Ethernet, wireless modem, etc.), and one or more payment/transaction vehicle receivers, transmitters, or transceivers.

The user 105 may request services or goods from the merchant 110 in return for a transaction amount (e.g., price) based on the services or goods requested by the user 105 (e.g., a transaction). The user 105 may have one or more transaction vehicles to tender payment of the transaction amount to the merchant 110. The transaction vehicles may be issued by one or more issuing bank systems, such as issuing bank system 140. The one or more transaction vehicles may be one or more of: credit cards, debit cards, digital representations of credit cards/debit cards transmitted by a user device (e.g., a cell phone), digital representations of credit cards/debit cards stored on the POS device 115 and associated with the user 105 by an account, and/or digital representations of credit cards/debit cards stored on the transaction processor system 130 and associated with the user 105 by an account. The transaction amount may be a cost of the goods or services requested via the transaction, plus any taxes or fees in addition thereto.

The user 105 may present one of the one or more transaction vehicles to the merchant 110 and/or the POS device 115, and the transaction vehicle may be connected to the one or more transaction vehicle receivers, transmitters, or transceivers based on a type of the presented transaction vehicle. For instance, the connection may be: (A) the user 105 swiping, inserting, and/or presenting a transaction vehicle (e.g., credit card or debit card) into/near a transaction vehicle reader/contactless transaction vehicle reader; (B) connecting the user device (e.g., a cell phone) by near field communication (NFC) to a contactless transaction vehicle reader to transmit/receive data wirelessly; or (C) providing information indicating an account associated with the digital representations. Providing information indicating an account associated with the digital representations may be performed by: (1) displaying a machine-readable optical label (e.g., a bar code, a QR code, or other graphical code) to a code reader; (2) transmitting the information from the user device; or (3) inputting the information on the POS device 115 via interface 115A.

The processor 115B of the POS device 115 may receive transaction vehicle information from the interface 115A, based on the connection of the transaction vehicle to the one or more transaction vehicle receivers, transmitters, or transceivers. The transaction vehicle information may include a transaction vehicle identifier. The transaction vehicle identifier may be credit card/debit card number, encrypted bank information, or token. The processor 115B of the POS device 115 also may receive/obtain information about the transaction. The information about the transaction may include a transaction amount, itemized list of goods or services, time, or location associated with the transaction.

The processor 115B of the POS device 115 may transmit a transaction message for payment to the transaction processor system 130, based on (1) receiving the transaction vehicle information and/or the information about the transaction, or (2) as discussed below with respect to FIGS. 2-4. The transaction message may be transmitted to the transaction processor system 130 over the network 120. The transaction message may include metadata and message information. The message information may include at least the transaction amount and the transaction vehicle identifier. Metadata may include information related to the merchant 110 and/or the merchant bank system 145, and the metadata also may include information that associates the transaction message with the transaction and/or at least one associated transaction.

Additionally or alternatively, the processor 115B of the POS device 115 may transmit another (e.g., a second) transaction message to the transaction processor system 130, the issuing bank system 140, or the merchant bank system 145 over the network 120. The another transaction message may include information that associates the above transaction message with the transaction and/or the at least one associated transaction. In the alternative case, the another transaction message does not include the information that associates the transaction message with the transaction and/or at least one associated transaction in the metadata.

The transaction processor system 130 may transmit a request for payment to one or more card association systems such as card association system 135, over the network 120. The one or more card association systems may process requests for payment as clearing houses. The card association system 135 may transmit the request to the issuing bank system 140 over the network 120.

The issuing bank system 140 may approve or decline the request for payment based on various parameters. The various parameters may include a current status of the user 105 (e.g., funds or credit available, etc.) and fraud detection processes. If approved, the issuing bank system 140 may transmit an approved transaction message to one or more of the card association system 135, the transaction processor system 130, the POS device 115, and the merchant bank system 145 over the network 120. If the issuing bank system 140 does not transmit the approved transaction message directly to the POS device 115, then one of the card association system 135, the transaction processor system 130, and the merchant bank system 145, may relay or transmit the approved transaction message to the POS device 115.

The issuing bank system 140, the card association system 135, the transaction processor system 130, the POS device 115, and the merchant bank system 145, may perform settlement and funding processes. Settlement and funding processes may be performed in batches. For instance, the POS device 115 may schedule batches of authorized transactions to be transmitted to the transaction processor system 130 over the network 120. The transaction processor system 130 may transmit, over the network 120, messages to the one or more card association systems, like the card association system 135, based on the authorized transactions. The one or more card association systems such as card association system 135, may transmit debit messages to the issuing bank system 140. The issuing bank system 140 may charge appropriate accounts of users, like the user 105, and transfer appropriate funds for the transactions to one or more merchant bank systems such as merchant bank system 145 (minus transaction fees for the transactions). Next, the merchant bank system 145 may deposit the funds into a merchant account associated with the merchant 110. The funds may be the total of all transaction amounts for the batch of authorized transactions, less the transaction fees for the transactions.

The merchant 110 may conclude the transaction based on an output of the POS device 115. To conclude the transaction, the merchant 110 may provide the goods or services to the user 105 or provide a receipt for the transaction if the goods or services were already provided. The output of the POS device 115 may be a confirmation that the transaction was approved based on receiving the approved transaction message, as discussed above.

However, to avoid paying high percentages in transaction fees, the POS device 115 may output a confirmation that the transaction is approved by the POS device 115, while not transmitting the transaction message immediately, as discussed below with respect to FIGS. 2-4. Instead, the POS device 115 may consolidate several small transactions as a group and transmit a transaction message for the group. In this way, the POS device 115 may avoid transaction fees that incur a higher percentage of the individual transactions. Furthermore, the POS device 115 may reduce the number of authorization requests and thereby reduce over all communication loads, processing loads, energy costs of the POS device 115, the transaction processor system 130, the issuing bank systems 140, the merchant bank systems 145, and the card association system 135. Moreover, as the POS device 115 may perform a process that does not transmit the authorization request in certain circumstances, but still approve the transaction, the POS device 115 may reduce a customer wait time.

Figure 2:
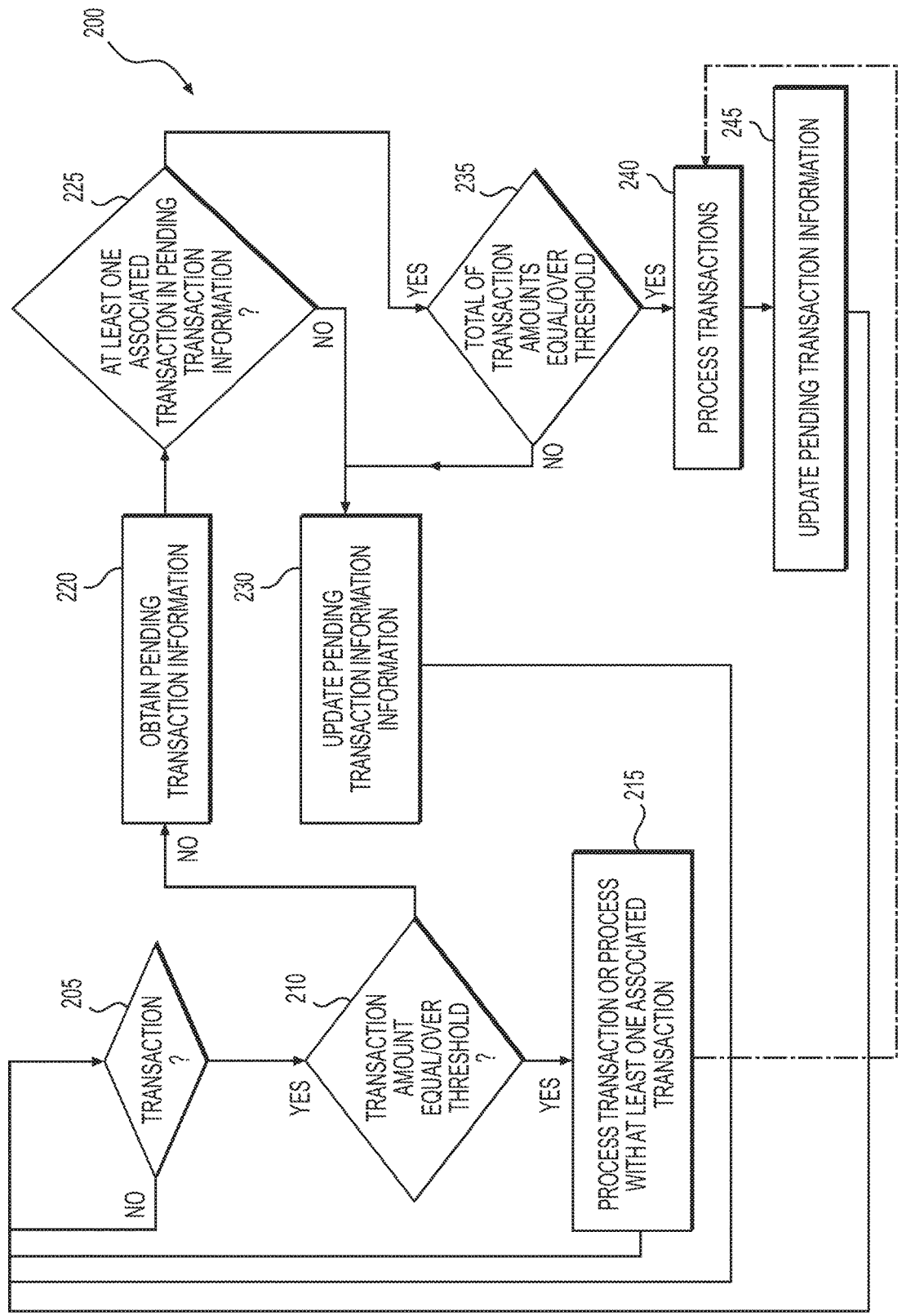
FIG. 2 depicts a flowchart for managing transactions, according to one or more embodiments.

FIG. 2 depicts a flowchart 200 for managing transactions, according to one or more embodiments. Flowchart 200 may be performed by the processor 115B of POS device 115 by executing a transaction amount threshold program. The processor 115B may start the program illustrated by flowchart 200 by determining whether a transaction has occurred (block 205). The processor 115B may determine whether a transaction has occurred based on receiving transaction information. The transaction information may include an identifier and a transaction amount associated with the transaction.

The identifier may include one or a combination of a transaction vehicle identifier (e.g., one of a credit card/debit card number, encrypted bank information, or token), social security number, account identifier, or routing identifier. For instance, a credit card/debit card number, encrypted bank information, token, or routing identifier may be received from the user 105 by the transaction vehicle being connected to the interface 115A; meanwhile, a social security number or account identifier may be obtained from the network 120 or the user 105 and/or based on the transaction vehicle identifier or the routing identifier.

If the processor 115B determines that no transaction has occurred (block 205: No), the processor 115B may loop back or wait for a transaction to occur (return to block 205).

If the processor 115B determines that a transaction has occurred (block 205: Yes), the processor 115B may compare the transaction amount to a threshold and determine whether the transaction amount is above, below, or equal to the threshold (block 210).

If the transaction amount is below the threshold (block 210: No), the processor 115B may proceed to obtain pending transaction information (block 220). The pending transaction information may include a plurality of transactions. The plurality of transactions may be transactions that have been previously received and not yet processed. The plurality of transactions may have corresponding identifiers and transaction amounts.

In response to/after obtaining the pending transaction information, the processor 115B may determine whether there is at least one associated transaction in the pending transaction information (block 225). The processor 115B may determine whether there is at least one associated transaction in the pending transaction information by analyzing the pending transaction information to determine whether there is at least one associated transaction associated with the transaction.

The analyzing the pending transaction information to determine whether there is the at least one associated transaction may include: identifying whether there is at least one pending transaction of the plurality of transactions that has a same identifier as the identifier of the transaction; and in response to identifying that there is at least one pending transaction of the plurality of transactions that has the same identifier as the identifier of the transaction, setting the at least one pending transaction of the plurality of transactions as the at least one associated transaction. The identifying whether there is at least one pending transaction of the plurality of transactions that has a same identifier as the identifier of the transaction may include using a string search algorithm (or a string match algorithm) to search the plurality of transactions of the pending transaction information for a transaction that has an identifier that is the same as the transaction. Alternatively, the identifying whether there is at least one pending transaction of the plurality of transactions that has a same identifier as the identifier of the transaction may include using an index search algorithm (or an index match algorithm) if the identifier is used as an index.

If the processor 115B determines that there is not at least one associated transaction in the pending transaction information (block 225: No), the processor 115B may proceed to update the pending transaction information. The processor 115B may update the pending transaction information by adding the transaction information, or the transaction and associated information, to the pending transaction information. The associated information may include one or a combination of the identifier, the transaction amount, a default pendency time (e.g., zero) or a time of the transaction, and a default threshold time period.

If the processor 115B determines that there is at least one associated transaction in the pending transaction information (block 225: Yes), and in response to setting the at least one pending transaction of the plurality of transactions as the at least one associated transaction, the processor 115B may analyze the transaction and the at least one associated transaction to determine whether to process the transaction and the at least one associated transaction. Specifically, if the processor 115B determines that there is at least one associated transaction in the pending transaction information (block 225: Yes), the processor 115B may proceed to compare a total of transaction amounts (inclusive of the transaction amount of the transaction and the transaction amount of the at least one associated transaction) to the threshold, to determine whether the total of transaction amount is above or equal to, or below the threshold (block 235). The processor 115B may determine whether the total of transaction amounts are above or equal to, or below the threshold by adding the transaction amounts for each of the transaction and the at least one associated transaction to obtain the total of the transaction amounts; then, the processor 115B may compare the total of the transaction amounts to the threshold.

If the processor 115B determines that the total of transaction amounts is equal to or above the threshold (block 235: Yes), the processor 115B may proceed to process the transactions (block 240). The processor 115B may process the transactions by generating and transmitting a transaction message to be sent to a transaction processing network. The transaction processing network may be the transaction processor system 130. The transaction message may include metadata and message information. The message information may indicate the total of the transaction amounts and the transaction vehicle identifier. The metadata may include information that associates the transaction message with the transaction and the least one associated transaction. For instance, information that associates the transaction message with the transaction and the least one associated transaction may include data that indicates a time and an amount for each of the transaction and the least one associated transaction.

Alternatively, the processor 115B may process the transactions by generating and transmitting a first transaction message to be sent to a first transaction processing network and a second transaction message to be sent to a second transaction processing network. The first transaction message may include the message information, and the second transaction message may include information that associates the first transaction message with the transaction and the at least one associated transaction, such as the information included in the metadata discussed above. The first transaction message may be transmitted to the transaction processor system 130 as the first transaction processing network so that it may be processed in the normal course by the card association system 135; meanwhile the second transaction message may be transmitted to one or more of the transaction processor system 130, the issuing bank merchant 140, the merchant bank 145, or a third party, as the second transaction processing network. The second transaction message may be used to de-couple the information about consolidated transactions from the payment process that operates through the card association systems.

In response to/after processing the transactions, the processor 115B may proceed to update the pending transaction information (block 245). The processor 115B may update the pending transaction information to remove/delete information corresponding to the at least one associated transaction from the pending transaction information.

In response to/after updating the pending transaction information (block 245), the processor 115B may loop back or wait for another transaction to occur (return to block 205).

If the processor 115B determines that the total of transaction amounts is below the threshold (block 235: No), the processor 115B may proceed to update the pending transaction information (block 230). The processor 115B may update the pending transaction information by adding the transaction information, or the transaction and the associated information, to the pending transaction information. In response to/after updating the pending transaction information (block 230), the processor 115B may loop back or wait for another transaction to occur (return to block 205).

If the transaction amount is equal to above the threshold (block 210: Yes), the processor 115B may proceed to process the transaction or process with at least one associated transaction (block 215), as discussed above. Specifically, the processor 115B may be configured to either (1) process the transaction if the transaction amount is equal to above the threshold (block 210: Yes), or (2) check whether there is an associated transaction before processing the transaction to consolidate any transactions that were pending because the transactions were below the threshold. If the processor is configured to check whether there is an associated transaction before processing the transaction, then the processor 115 may perform the processes associated with blocks 220 and 225 in parallel to the process of block 210 or before the process of block 215 to determine there is (1) not at least one associated transaction or (2) there is at least one associated transaction.

If the processor 115б proceeds to process the transaction (because there is not at least one associated transaction), as discussed above, the processor 115б may loop back or wait for another transaction to occur (return to block 205).

If the processor 115б proceeds to process with at least one associated transaction, the processor 115б may proceed to process the transactions (block 240), as discussed above.

Figure 3:
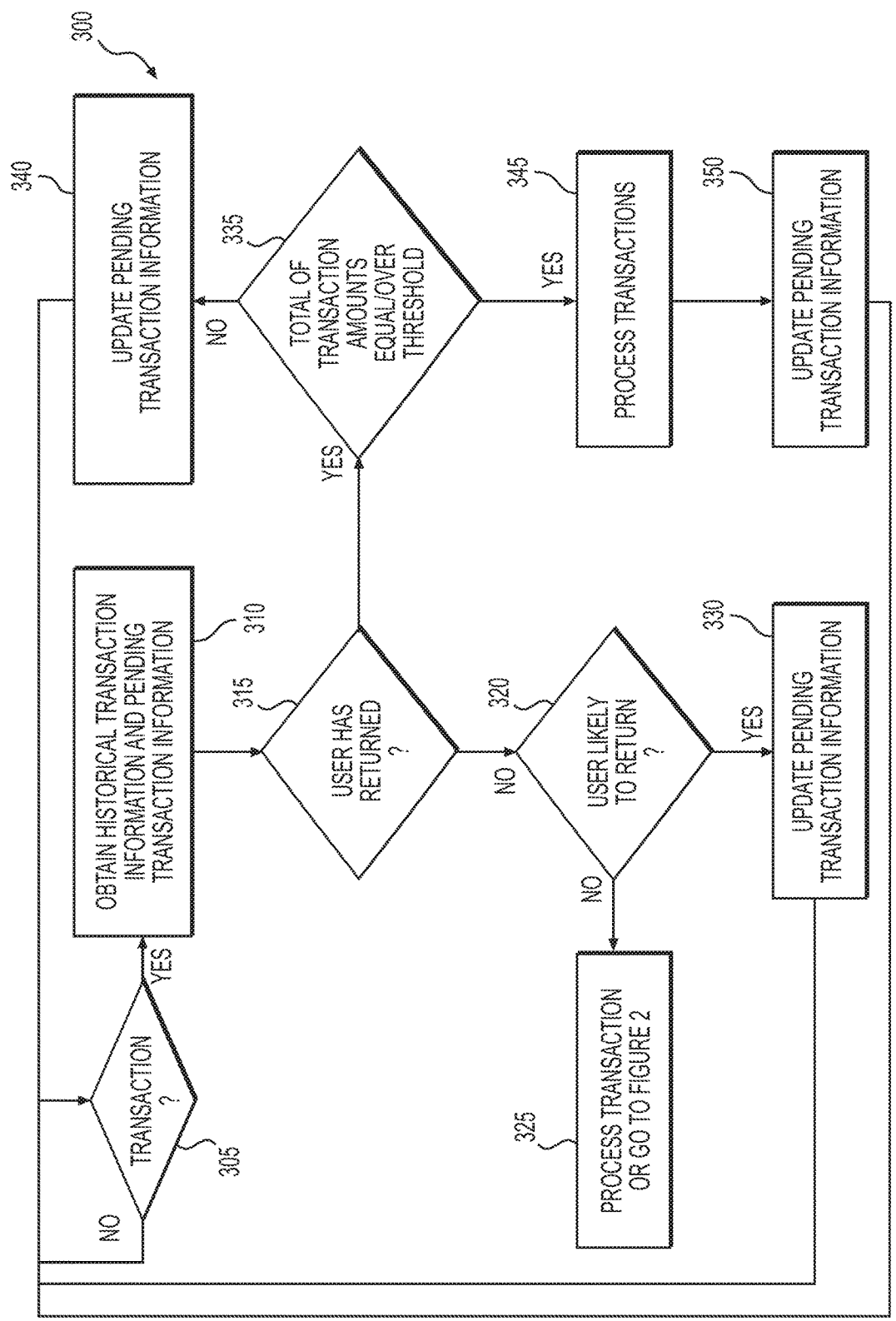
FIG. 3 depicts a flowchart for managing transactions, according to one or more embodiments.

FIG. 3 depicts a flowchart 300 for managing transactions, according to one or more embodiments. Flowchart 300 may be performed by the processor 115B of POS device 115 by executing a user prediction program. The processor 115B may start the process illustrated in flowchart 300 by determining whether a transaction has occurred (block 305). The processor 115B may determine whether a transaction has occurred based on receiving transaction information. The transaction information may include an identifier and a transaction amount associated with the transaction.

If the processor 115B determines that no transaction has occurred (block 305: No), the processor 115б may loop back or wait for a transaction to occur (return to block 305).

If the processor 115б determines that a transaction has occurred (block 305: Yes), the processor 115б may proceed to obtain historical transaction information and pending transaction information (block 310). Historical transaction information (also called processed transaction information) may include a plurality of transactions. The plurality of transactions may be associated with the user 105 based on the identifier, and the plurality of transactions may have corresponding merchant identifiers. For instance, the historical transaction information may be based on one or more of: (1) credit history reporting; (2) processed transactions of the issuing bank system 140; (3) processed transactions through the transaction processor system 130; (4) processed transactions through the card association system 135; or (5) processed transactions through the merchant bank system 145. Additionally or alternatively, the user 105 may have a mobile application on a user device (e.g., cell phone) that may generate location information. Location information may include locations of the user 105/user device and when the user 105/user device arrives and departs locations. The mobile application may provide the location information to the POS device 115 or to a central service that provides the historical transaction information. The location information may be used in place of or to supplement the historical transaction information.

The processor 115B may then proceed to determine whether the user has returned (block 315). The processor 115б may determine whether the user has returned by identifying whether there is a pending transaction of the plurality of transactions, of the pending transaction information, that has a same identifier as the identifier of the transaction, as discussed above with respect to block 225 of FIG. 2. In response to/after identifying that there is a pending transaction, the processor 115б determines that the user has returned.

If the processor 115б determines that the user 105 has returned (block 315: Yes), the processor 115б may proceed to compare a total of transaction amounts to a threshold to determine whether the total of transaction amounts are above, equal to, or below the threshold (block 335), as discussed above with respect to block 235 of FIG. 2.

If the processor 115б determines that the total of transaction amounts is equal to or above a threshold (block 335: Yes), the processor 115б may proceed to process the transactions (block 345), as discussed above with respect to block 240 of FIG. 2.

In response to/after processing the transactions (block 345), the processor 115б may proceed to update the pending transaction information (block 350). The processor 115б may update the pending transaction information to remove/delete information corresponding to the pending transaction from the pending transaction information.

In response to/after updating the pending transaction information (block 350), the processor 115B may loop back or wait for another transaction to occur (return to block 305).

If the processor 115B determines that the total of transaction amounts is below the threshold (block 335: No), the processor 115B may proceed to update the pending transaction information (block 340). The processor 115B may update the pending transaction information by adding the transaction information, or the transaction and the associated information, to the pending transaction information.

In response to/after updating the pending transaction information (block 340), the processor 115B may loop back or wait for another transaction to occur (return to block 305).

If the processor 115B determines that the user 105 has not returned (block 315: No) the processor 115B may proceed to determine whether the user is likely to return (block 320). The processor 115B may determine whether the user is likely to return by performing an analysis of the processed transaction information. The processor 115B may perform the analysis of the processed transaction information by analyzing the plurality of transactions and/or the location information. For instance, the processor 115B may perform a time series analysis or frequency analysis on the plurality of transactions and/or the location information.

Specifically, in one aspect of the disclosure, the processor 115B may identify whether there is at least one prior transaction of the plurality of transactions of the processed transaction information that has a same merchant identifier as a merchant identifier of the POS device 115. This may be accomplished by using a string-search algorithm or an index search algorithm with the merchant identifier of the POS device 115 with respect to the merchant identifiers of the plurality of transactions. In response to/after identifying that there is at least one prior transaction that has the same merchant identifier as the merchant identifier of the POS device 115, the processor 115б may: perform a time series or frequency analysis on the at least one prior transaction to determine a frequency that the user 105 returns to the POS device 115 or a likelihood of the user to return to the POS device 115 (or an associated system). The processor 115B may, in response to performing the time series or frequency analysis, determine whether the frequency or the likelihood of the user to return is above or below a threshold. In response to determining that the frequency or the likelihood of the user to return is above (or equal to) the threshold, the processor 115б may determine that the user 105 is likely to return. Alternatively, the processor 115б may, in response to determining that the frequency or the likelihood of the user to return is below (or equal to) the threshold, the processor 115B may determine that the user 105 is not likely to return.

In another aspect of the disclosure, the processor 115б may identify whether there is at least one location of the locations of the location information that has a same location as merchant 110 or a location of the POS device 115. This may be accomplished by using GPS position analysis of the locations in the location information with respect to a bounded area associated with the merchant 110 or the POS device 115. The bounded area may be a perimeter of a building (e.g., a store) of the merchant 110 or a perimeter a threshold distance from a certain location within a building. In response to/after identifying that there is at least one location, the processor 115B may perform a time series or frequency analysis of the at least one location to determine a frequency that the user returns and/or average period between returns to the location of the merchant 110 or the POS device 115. When the frequency is above a frequency threshold or the period is below a period threshold, the processor 115B may determine that the user 105 is likely to return. The frequency threshold may be a set rate or the frequency threshold may be based on a threshold time period, discussed below. The period threshold may be a set length of time or the period threshold may be based on the threshold time period.

If the processor 115B determines that the user 105 is not likely to return (block 320: No), the processor 115B may proceed to process the transaction, as discussed above, or, alternatively, the processor 115B may proceed to the process illustrated in flowchart 200 of FIG. 2 and execute a transaction amount threshold program (block 325).

If the processor 115B determines that the user 105 is likely to return (block 320: Yes), the processor 115B may proceed to update the pending transaction information (block 330). The processor 115B may update the pending transaction information by adding the transaction information, or the transaction and the associated information, to the pending transaction information.

In response to/after updating the pending transaction information (block 330), the processor 115B may loop back or wait for another transaction to occur (return to block 305).

Figure 4:
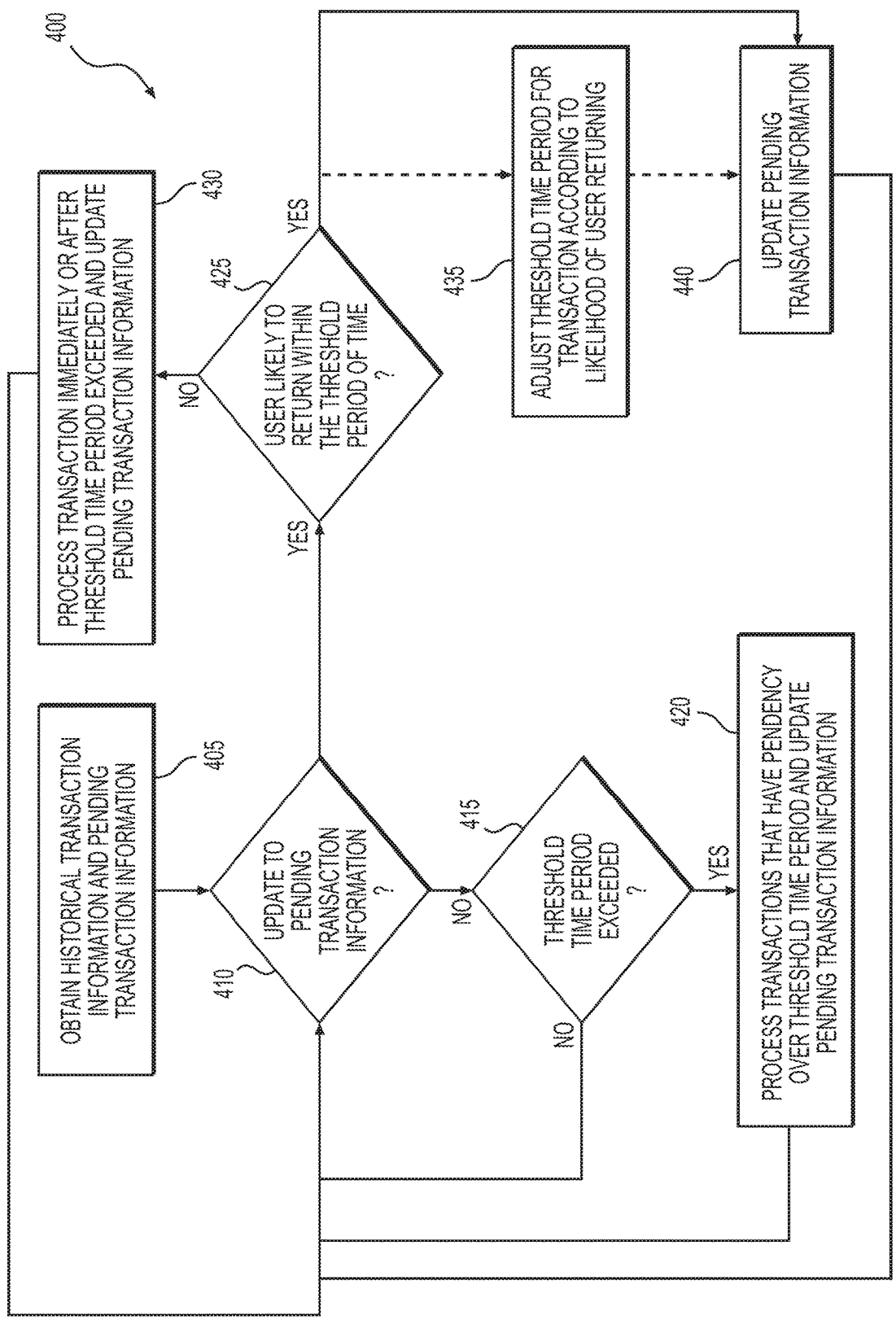
FIG. 4 depicts a flowchart for managing transactions, according to one or more embodiments.

FIG. 4 depicts a flowchart 400 for managing transactions, according to one or more embodiments. Flowchart 400 may be performed by the processor 115B of POS device 115 by executing a transaction pendency check program. The processor 115B may start the process illustrated by flowchart 400 by obtaining historical transaction information and pending transaction information (block 405).

The processor 115B may proceed to determine whether there has been at least one update to the pending transaction information (block 410). The processor 115B may determine whether there has been at least one update to the pending transaction information by analyzing times associated with the plurality of transactions of the pending transaction information, by a counter indicating a change in a number of the plurality of transactions, or by an update log/flag indicating an update.

If the processor 115B determines that there has not been at least one update to the pending transaction information (block 410: No), the processor 115B may compare pendency time periods of transactions in the pending transaction information to a threshold time period to determine whether the pendency time period is above, equal to, or less than the threshold time period (block 415). The processor 115B may obtain pendency time periods of the transactions by calculating a difference between a current time and a time that the transaction was stored/or the transaction vehicle was presented to the POS device 115.

If the processor 115B determines that there is at least one transaction with a pendency time period above the threshold time period (block 415: Yes), the processor 115B may proceed to process the at least one transaction and update the pending transaction information (block 420). The processor 115B may process the at least one transaction, as discussed above with respect to block 215 or block 235 of FIG. 2. The processor 115B may update the pending transaction information to remove/delete information corresponding to the at least one transaction from the pending transaction information.

In response to/after processing the at least one transaction and updating the pending transaction information (420), the processor 115B may loop back or wait for an update to the pending transaction information to occur (return to block 410).

If the processor 115B determines that there are no transactions with a pendency time period above the threshold time period (or all pendency time periods are below or equal to the threshold time period) (block 415: No), the processor 115B may loop back or wait for an update to the pending transaction information to occur (return to block 410).

If the processor 115B determines that there has been at least one update to the pending transaction information (block 410: Yes), the processor 115B may proceed to determine whether a user 105 associated with the at least one update is likely to return within the threshold time period (block 425). The processor 115B may determine whether the user 105 is likely to return within the threshold time period by: (1) determining the frequency, the likelihood of the user 105 to return, or the average period between returns, as discussed above with respect to block 320 in FIG. 3; (2) comparing the frequency, the likelihood of the user 105 to return, or the average period between returns to corresponding thresholds, set based on the threshold time period; and (3) based on comparison results, determining that the user 105 will return within the threshold time period. The corresponding thresholds may be the same or may be different than the thresholds used in FIG. 3, based in part on the threshold period of time.

If the processor 115B determines that the user 105 is likely to return within the threshold time period (block 425: Yes), the processor 115B may proceed to update the pending transaction information (block 440) and/or loop back or wait for an update to the pending transaction information to occur (return to block 410). The processor 115B may update the pending transaction information by adding or changing a pre-existing element of the pending transaction information associated with the transaction that is associated with at least one update. The added or changed pre-existing element may be an indication of how likely it is the user 105 will return or an estimate of when the user will return.

Additionally or alternatively, the threshold time period may be dynamically adjusted for each transaction/identifier/user in the pending transaction information. Specifically, if the processor 115B determines that the user 105 is likely to return within the threshold time period (block 425: Yes), the processor 115B may proceed to adjust the threshold time period associated with the transaction/identifier/user (block 435), then update the pending transaction information (block 440) and/or loop back or wait for an update to the pending transaction information to occur (return to block 410).

If the processor 115B determines that a user is not likely to return within the threshold time period (block 425: No), the processor 115B may proceed to process the transaction immediately or after the threshold time period, and update the pending transaction information (block 430). The processor 115B may process the transaction, as discussed above with respect to block 235 of FIG. 2. The processor 115B may update the pending transaction information after processing the transaction, to remove/delete information corresponding to the transaction from the pending transaction information.

Generally, when the processor 115B compares a transaction amount, a total of transaction amounts, or a pendency time to a threshold or a threshold time period, respectively, the processor 115B may (based on user/administrator inputs) change how the "equal to" the threshold or threshold time period is handled by the processor 115B (e.g., toggle a setting so that it is (1) equal to or above, or (2) equal to or below).

Furthermore, the threshold may be changed by a user/administrator to be a set dollar amount. Alternatively or additionally, the threshold may be set for transactions based on which one of the card association systems 135 is to process the transaction. For instance, if one card association system 135 charges a fixed minimum transaction fee at a different dollar amount than another card association system 135, then the processor 115B may use a first threshold and second threshold for transactions that will be processed by the one card association system 135 and the another card association 135, respectively. Similarly, the processor 115B, for each card association system, may have associated thresholds based on the transaction fee rules for each card association system 135.

Moreover, the threshold time period may be changed by a user/administrator to a certain period of time (e.g., one day). The certain period of time may be selected from a minimum time period (e.g., no threshold time period, thereby effectively opting out of the transaction pendency check program) up to a maximum time period. The maximum time period may be set based on limits issuing bank systems 140, merchant bank systems 145, transaction processor systems 130, or legal maximums indicate is acceptable/required. The processor 115B may select the longest time period among the various limits for the transaction based on which systems are to process the transaction.

Moreover, the above-described processes in FIGS. 2-4 may be implemented on the transaction processor system 130 with appropriate modifications. In this aspect of the disclosure, the POS device 115 automatically transmits transaction messages to the transaction processor system 130, but the transaction processor system 130 does not transmit to the one or more card association systems, like the card association system 135. In this manner, the transaction processor system 130 may consolidate transactions that would incur the higher percentage transaction fees; reduce communication load, processing load, and energy costs associated with small payment amount transactions; and reduce user/customer wait time at the POS device 115 by transmitting an authorization message to the POS device 115.

Figure 5:
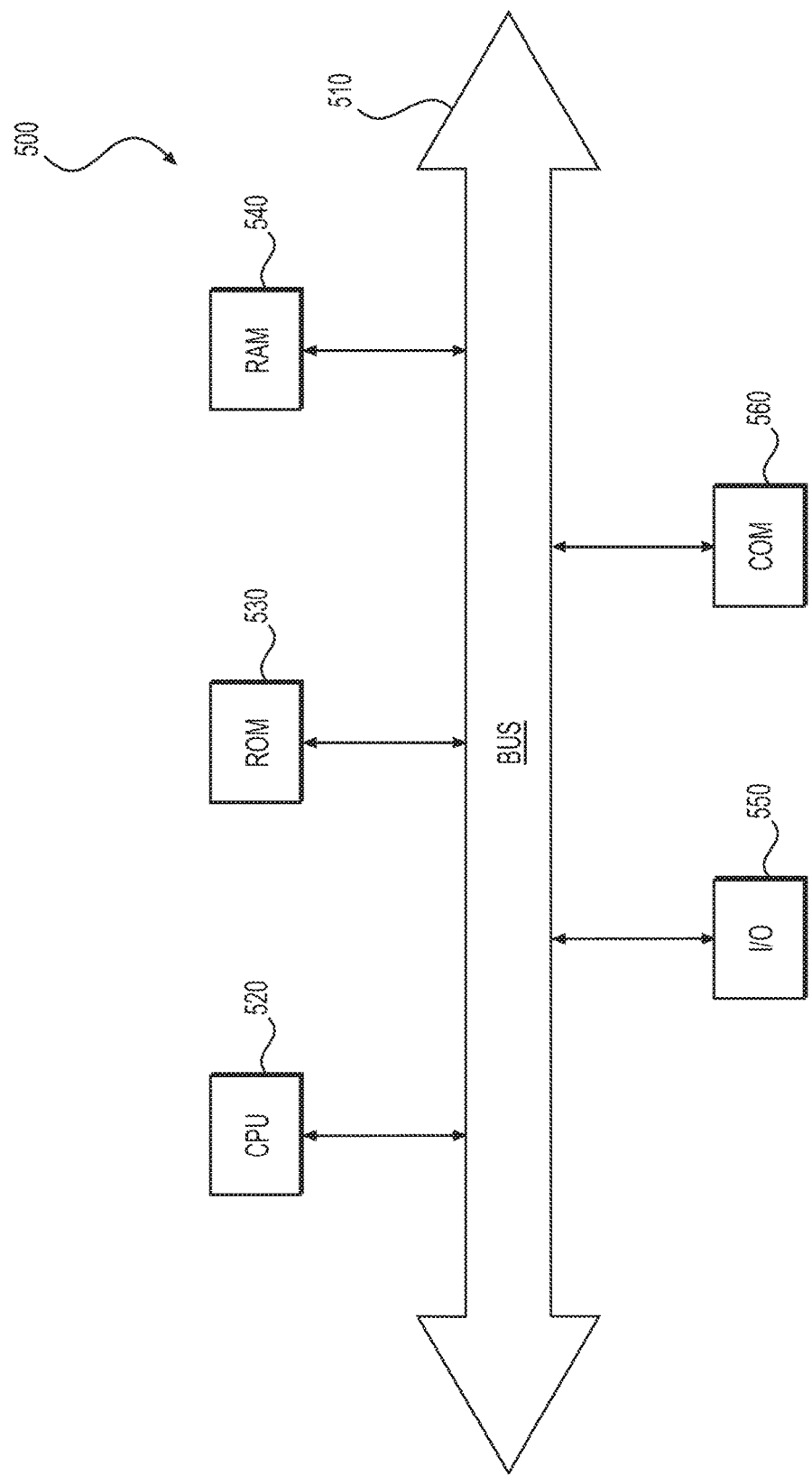
FIG. 5 depicts an example system that may execute techniques presented herein.

FIG. 5 depicts an example system 500 that may execute techniques presented herein. FIG. 5 is a simplified functional block diagram of a computer that may be configured to execute techniques described herein, according to exemplary embodiments of the present disclosure. Specifically, the computer (or "platform" as it may not a be a single physical computer infrastructure) may include a data communication interface 560 for packet data communication. The platform also may include a central processing unit ("CPU") 520, in the form of one or more processors, for executing program instructions. The platform may include an internal communication bus 510, and the platform also may include a program storage and/or a data storage for various data files to be processed and/or communicated by the platform such as ROM 530 and RAM 540, although the system 500 may receive programming and data via network communications. The system 500 also may include input and output ports 550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for managing transactions, the method comprising:
    receiving transaction information for a transaction, the transaction information including an identifier and a transaction amount associated with the transaction;
    comparing the transaction amount to a threshold to determine whether the transaction amount is equal to or above the threshold, or whether the transaction amount is below the threshold; and
    in response to determining that the transaction amount is below the threshold:
        obtaining pending transaction information, wherein the pending transaction information includes a plurality of transactions, each of the plurality of transactions having been previously received and not yet processed, and each of the plurality of transactions having corresponding identifiers and transaction amounts;
        analyzing the pending transaction information to determine whether there is at least one associated transaction associated with the transaction, wherein the analyzing the pending transaction information to determine whether there is the at least one associated transaction includes:
            identifying whether there is at least one pending transaction of the plurality of transactions that has a same identifier as the identifier of the transaction; and
            in response to identifying that there is at least one pending transaction of the plurality of transactions that has the same identifier as the identifier of the transaction, setting the at least one pending transaction of the plurality of transactions as the at least one associated transaction; and
    performing at least one processing action to resolve the transaction,
    wherein the performing the at least one processing action to resolve the transaction includes, in response to setting the at least one pending transaction of the plurality of transactions as the at least one associated transaction, analyzing the transaction and the at least one associated transaction to determine whether to process the transaction and the at least one associated transaction,
    wherein the analyzing the transaction and the at least one associated transaction to determine whether to process the transaction and the at least one associated transaction includes:
        adding the transaction amount of the transaction and a transaction amount of the at least one associated transaction to obtain a total transaction amount;
        comparing the total transaction amount to the threshold to determine whether the total transaction amount is equal to or above the threshold, or whether the total transaction amount is below the threshold; and
        in response to determining that the total transaction amount is equal to or above the threshold:
            processing the transaction and the at least one associated transaction; and
            removing the at least one associated transaction from the pending transaction information;
        wherein the processing the transaction and the least one associated transaction includes:
            generating a first transaction message to be sent to a first transaction processing network and a second transaction message to be sent to a second transaction processing network, the first transaction message including message information, the message information indicating the total transaction amount, the second transaction message including de-coupling information that associates the first transaction message with the transaction and the at least one associated transaction, the de-coupling information including data indicating a time and an amount for each of the transaction and the least one associated transaction; and
            transmitting the first transaction message and the second transaction message to the first transaction processing network and the second transaction processing network, respectively,
    wherein the first transaction processing network is a transaction processor system, the transaction processor system transmits a request for payment for the total transaction amount to one or more card association systems, the second transaction processing network is the transaction processor system, an issuing bank system, or a merchant bank system, and the second transaction processing network uses the de-coupling information of the second transaction message to de-couple information about consolidated transactions from a payment process that operates through the one or more card association systems.

2. The computer-implemented method of claim 1, wherein, in response to determining that the total transaction amount is below the threshold, updating the pending transaction information to include the transaction information.

3. The computer-implemented method of claim 1, wherein the analyzing the pending transaction information to determine whether there is the at least one associated transaction associated with the transaction further includes:
    determining whether no transaction has the same identifier as the identifier of the transaction, and the performing the at least one processing action to resolve the transaction includes, when the determining determines that no transaction has the same identifier as the identifier of the transaction, updating the pending transaction information to include the transaction information.

4. The computer-implemented method of claim 1, further comprising:
in response to determining that the transaction amount is equal to or above the threshold, processing the transaction.

5. The computer-implemented method of claim 4, further comprising, before the processing the transaction:
identifying whether there is at least one other pending transaction of the plurality of transactions included in the pending transaction information that has the same identifier as the identifier of the transaction,
in response to identifying that there is at least one other pending transaction, processing the transaction and the at least one other pending transaction, and
removing the at least one other pending transaction from the pending transaction information.

6. A computer-implemented method for managing transactions, the method comprising:
receiving transaction information for a transaction, the transaction information including an identifier and a transaction amount associated with the transaction;
comparing the transaction amount to a threshold to determine whether the transaction amount is equal to or above the threshold, or whether the transaction amount is below the threshold; and
in response to determining that the transaction amount is below the threshold:
obtaining pending transaction information, wherein the pending transaction information includes a plurality of transactions, each of the plurality of transactions having been previously received and not yet processed, and each of the plurality of transactions having corresponding identifiers and transaction amounts;
identifying whether there is at least one pending transaction of the plurality of transactions that has a same identifier as the identifier of the transaction; and
in response to identifying that there is at least one pending transaction of the plurality of transactions that has the same identifier as the identifier of the transaction, setting the at least one pending transaction of the plurality of transactions as an at least one associated transaction; and
in response to setting the at least one pending transaction of the plurality of transactions as the at least one associated transaction, processing the transaction and the at least one associated transaction when a total transaction amount for the transaction and the at least one associated transaction is equal to or above the threshold;
wherein the processing the transaction and the least one associated transaction includes:
generating a first transaction message to be sent to a first transaction processing network and a second transaction message to be sent to a second transaction processing network, the first transaction message including message information, the message information indicating the total transaction amount, the second transaction message including de-coupling information that associates the first transaction message with the transaction and the at least one associated transaction, the de-coupling information including data indicating a time and an amount for each of the transaction and the least one associated transaction; and
transmitting the first transaction message and the second transaction message to the first transaction processing network and the second transaction processing network, respectively,
wherein the first transaction processing network is a transaction processor system, the transaction processor system transmits a request for payment for the total transaction amount to one or more card association systems, the second transaction processing network is the transaction processor system, an issuing bank system, or a merchant bank system, and the second transaction processing network uses the de-coupling information of the second transaction message to de-couple information about consolidated transactions from a payment process that operates through the one or more card association systems.

7. The computer-implemented method of claim 6, further comprising, to determine when the total transaction amount for the transaction and the at least one associated transaction is equal to or above the threshold:
adding the transaction amount of the transaction and a transaction amount of the at least one associated transaction to obtain the total transaction amount;
comparing the total transaction amount to the threshold to determine whether the total transaction amount is equal to or above the threshold, or whether the total transaction amount is below the threshold; and
in response to determining that the total transaction amount is equal to or above the threshold:
processing the transaction and the at least one associated transaction.

8. The computer-implemented method of claim 7, further comprising, in response to determining that the total transaction amount is equal to or above the threshold:
removing the at least one associated transaction from the pending transaction information.

9. The computer-implemented method of claim 7, further comprising:
in response to determining that the total transaction amount is below the threshold, updating the pending transaction information to include the transaction information.

10. A computer-implemented method for managing transactions, the method comprising:
receiving transaction information for a transaction, the transaction information including an identifier and a transaction amount associated with the transaction;
comparing the transaction amount to a threshold to determine whether the transaction amount is equal to or above the threshold, or whether the transaction amount is below the threshold; and
in response to determining that the transaction amount is below the threshold:
obtaining pending transaction information, wherein the pending transaction information includes a plurality of transactions, each of the plurality of transactions having been previously received and not yet processed, and each of the plurality of transactions having corresponding identifiers and transaction amounts;
identifying whether there is at least one pending transaction of the plurality of transactions that has a same identifier as the identifier of the transaction; and in response to identifying that there is at least one pending transaction of the plurality of transactions that has the same identifier as the identifier of the transaction, processing the transaction and the at least one pending transaction when a total transaction amount for the transaction and the at least one pending transaction is equal to or above the threshold;

wherein the processing the transaction and the least one pending transaction includes:

generating a first transaction message to be sent to a first transaction processing network and a second transaction message to be sent to a second transaction processing network, the first transaction message including message information, the message information indicating the total transaction amount, the second transaction message including de-coupling information that associates the first transaction message with the transaction and the at least one pending transaction, the de-coupling information including data indicating a time and an amount for each of the transaction and the least one pending transaction; and transmitting the first transaction message and the second transaction message to the first transaction processing network and the second transaction processing network, respectively, wherein the first transaction processing network is a transaction processor system, the transaction processor system transmits a request for payment for the total transaction amount to one or more card association systems, the second transaction processing network is the transaction processor system, an issuing bank system, or a merchant bank system, and the second transaction processing network uses the de-coupling information of the second transaction message to de-couple information about consolidated transactions from a payment process that operates through the one or more card association systems.

11. The computer-implemented method of claim 10, further comprising, to determine when the total transaction amount for the transaction and the at least one pending transaction is equal to or above the threshold:

adding the transaction amount of the transaction and a transaction amount of the at least one pending transaction to obtain the total transaction amount;

comparing the total transaction amount to the threshold to determine whether the total transaction amount is equal to or above the threshold, or whether the total transaction amount is below the threshold; and in response to determining that the total transaction amount is equal to or above the threshold:

processing the transaction and the at least one pending transaction.

12. The computer-implemented method of claim 11, further comprising, in response to determining that the total transaction amount is equal to or above the threshold:

removing the at least one associated transaction from the pending transaction information.

13. The computer-implemented method of claim 11, further comprising:

in response to determining that the total transaction amount is below the threshold, updating the pending transaction information to include the transaction information.

14. The computer-implemented method of claim 10, wherein the identifier includes one or a combination of a transaction vehicle identifier, a social security number, an account identifier, or a routing identifier.

15. The computer-implemented method of claim 14, wherein the transaction vehicle identifier includes a credit card/debit card number, encrypted bank information, or a token.

16. The computer-implemented method of claim 15, wherein the credit card/debit card number, the encrypted bank information, or the token are received from a user by a transaction vehicle being connected to an interface.

17. The computer-implemented method of claim 15, wherein the security number or the account identifier are obtained from a network that is connected to the interface.

18. The computer-implemented method of claim 10, further comprising:

outputting a confirmation that the transaction is approved, while not transmitting the first transaction message or the second transaction message immediately.

\* \* \* \* \*